(12) United States Patent
Weyrich et al.

(10) Patent No.: US 6,723,155 B2
(45) Date of Patent: Apr. 20, 2004

(54) PURIFICATION OF GAS STREAMS

(75) Inventors: Gregory Scott Weyrich, Wescosville, PA (US); Shyam Ramchand Suchdeo, Wescosville, PA (US); Christopher James Raiswell, Crewe (GB); Elizabeth Helen Salter, Stoke-on-Trent (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/135,295

(22) Filed: Apr. 29, 2002

(65) Prior Publication Data

US 2003/0200866 A1 Oct. 30, 2003

(51) Int. Cl.[7] ............................................... B01D 53/04
(52) U.S. Cl. .......................... 95/120; 95/123; 95/129; 95/139; 96/130; 96/132; 96/143
(58) Field of Search ..................... 95/96–106, 117–126, 95/129, 139, 902; 96/108, 128, 130–133, 143, 144

(56) References Cited

U.S. PATENT DOCUMENTS

| 3,150,942 | A | * | 9/1964 | Vasan ........................... 95/115 |
| 4,541,851 | A | * | 9/1985 | Bosquain et al. .............. 96/126 |
| 4,964,888 | A | | 10/1990 | Miller ............................ 55/58 |
| 5,137,548 | A | * | 8/1992 | Grenier et al. ................. 95/41 |
| 5,232,474 | A | * | 8/1993 | Jain ............................... 95/97 |
| 5,529,610 | A | * | 6/1996 | Watson et al. ................. 95/100 |
| 5,728,198 | A | | 3/1998 | Acharya et al. ............... 95/114 |
| 5,769,928 | A | * | 6/1998 | Leavitt ........................... 95/95 |
| 5,810,909 | A | * | 9/1998 | Notaro et al. .................. 95/96 |
| 5,855,650 | A | * | 1/1999 | Kalbassi et al. .............. 95/106 |
| 5,885,331 | A | * | 3/1999 | Reiss et al. ..................... 95/96 |
| 5,897,686 | A | * | 4/1999 | Golden et al. .................. 95/99 |
| 5,914,455 | A | * | 6/1999 | Jain et al. ....................... 95/96 |
| 5,919,286 | A | * | 7/1999 | Golden et al. .................. 95/98 |
| 6,027,548 | A | * | 2/2000 | Ackley et al. .................. 95/96 |
| 6,106,593 | A | | 8/2000 | Golden et al. ................. 95/120 |
| 6,152,991 | A | * | 11/2000 | Ackley ........................... 95/96 |
| 6,391,092 | B1 | * | 5/2002 | Shen et al. .................... 95/120 |
| 6,409,800 | B1 | * | 6/2002 | Ojo et al. ........................ 95/96 |
| 6,432,171 | B1 | * | 8/2002 | Kumar et al. .................. 95/120 |
| 6,506,236 | B2 | * | 1/2003 | Golden et al. ................. 95/129 |
| 2003/0029314 | A1 | * | 2/2003 | Nakamura et al. ............ 95/117 |

FOREIGN PATENT DOCUMENTS

EP            0449576            10/1991

* cited by examiner

*Primary Examiner*—Robert H. Spitzer
(74) *Attorney, Agent, or Firm*—John M. Fernbacher

(57) ABSTRACT

A method for removing a first and a second minor component from a gas mixture comprising the first and second minor components and one or more major components. The method comprises providing a first adsorbent zone containing a first adsorbent material and a second adsorbent zone containing a second adsorbent material wherein the selectivity of the first adsorbent material for the first minor component relative to the second minor component is greater than the selectivity of the second adsorbent material for the first minor component relative to the second minor component. The average particle diameter of the first adsorbent material and the average particle diameter of the second adsorbent material preferably are substantially the same. The gas mixture is passed through the first adsorbent zone and subsequently through the second adsorbent zone. A purified gas containing the one or more major components and depleted in the first and second minor component is withdrawn from the second adsorbent zone.

18 Claims, 1 Drawing Sheet

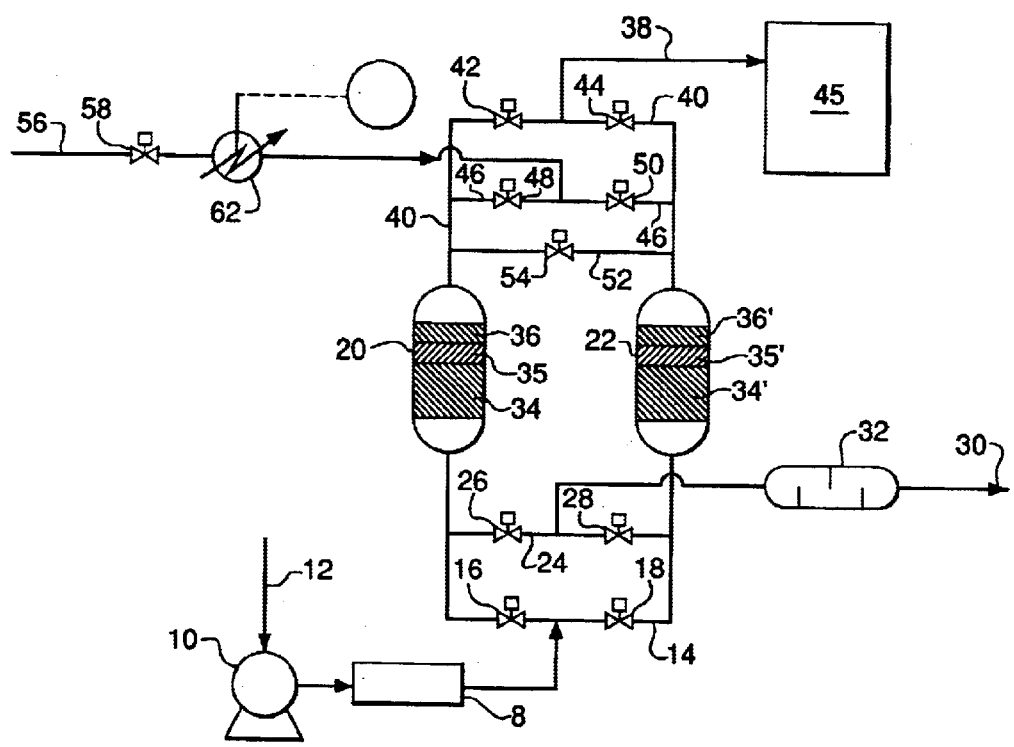

PURIFICATION OF GAS STREAMS

BACKGROUND OF THE INVENTION

The present invention relates to a method and apparatus for removing impurities from a feed gas stream by adsorption, particularly by temperature swing adsorption.

The cryogenic purification of air requires a pre-purification step for the removal of high-boiling and hazardous materials. Principal high-boiling air components include water and carbon dioxide. If removal of these impurities from ambient air is not achieved prior to the air separation system, then water and carbon dioxide will freeze out in cold sections of the separation apparatus (for example in the heat exchangers and liquid oxygen sump) causing pressure drop and operational problems. Various hazardous materials including nitrous oxide, acetylene, and other hydrocarbons also must be removed. High-boiling hydrocarbons are problematic because they concentrate in the liquid oxygen section of the separation apparatus, resulting in a potential explosive hazard. In addition, nitrous oxide can form unstable compounds with the hydrocarbons and this is another potential hazard.

Adsorption processes are generally preferred for the removal of these impurities from feed air to cryogenic air separation plants. These adsorption processes include thermal swing adsorption (described in U.S. Pat. Nos. 4,541,851 and 5,137,548) and pressure swing adsorption (described in U.S. Pat. No. 5,232,474) systems. These systems usually are designed for total water and carbon dioxide removal from ambient air. Adsorbents selective for water and carbon dioxide are required for these systems.

Thermal swing adsorption processes typically use layered adsorbent beds in which the feed air first contacts a water-selective adsorbent such as alumina or silica gel. The dry, carbon dioxide containing air then contacts a zeolite adsorbent to remove carbon dioxide to very low levels. Hydrocarbons and nitrous oxide also are removed by the appropriate adsorbents, typically in layered configuration.

The term "mass transfer zone" as used herein refers to the section of an adsorbent bed in which adsorbent loading of the adsorbate is occurring. Ahead of the leading edge of the mass transfer zone, the gas concentrations of the adsorbed components are reduced relative to the feed. At the trailing edge of the mass transfer zone and behind the trailing edge gas phase composition is substantially equal to that of the feed mixture and the adsorbent is substantially loaded to capacity with the adsorbed components from the feed mixture. A small mass transfer zone is beneficial and allows a higher adsorbate loading on the adsorbent before the leading edge of the mass transfer zone breaks through the effluent end of the adsorbent bed. This results in more efficient adsorbent bed operation. Consequently, a smaller bed may be used or the onstream time between regenerations may be increased.

Small adsorbent particles generally provide shorter mass transfer zones than large adsorbent particles. The prior art processes disclosed in U.S. Pat. Nos. 4,964,888 and 5,728,198 and European Patent Publication EP-A-449576 improve mass transfer characteristics by using a layer of smaller adsorbent particles downstream of a layer of larger adsorbent particles. However, the use of small adsorbent particles can cause a greater pressure drop across the adsorbent bed and can result in fluidization, adsorbent attrition, and carryover of fine adsorbent particles. The present invention, which is described below and defined by the claims which follow, addresses this problem by using at least two layers of different adsorbents which have substantially the same average particle diameters. The relative adsorption selectivities of the adsorbents for two of the impurities are specified as described below.

BRIEF SUMMARY OF THE INVENTION

The invention relates to a method for removing a first and a second minor component from a gas mixture comprising the first and second minor components and one or more major components. The method comprises the steps of:

(a) providing a first adsorbent zone containing a first adsorbent material and a second adsorbent zone containing a second adsorbent material, wherein the selectivity of the first adsorbent material for the first minor component relative to the second minor component is greater than the selectivity of the second adsorbent material for the first minor component relative to the second minor component, and wherein the average particle diameter of the first adsorbent material and the average particle diameter of the second adsorbent material are substantially the same;

(b) passing the gas mixture comprising the first and second minor components and the one or more major components through the first adsorbent zone and subsequently through the second adsorbent zone; and (c) withdrawing from the second adsorbent zone a purified gas containing the one or more major components and depleted in the first and second minor components.

The first minor component may be nitrous oxide and the second minor component may be carbon dioxide. The one or more major components may comprise oxygen and nitrogen. The gas-mixture may comprise air.

The average particle diameter of the first adsorbent material preferably is between about 85% and about 115% of the average particle diameter of the second adsorbent material. The average particle diameter of the first adsorbent material may be between about 0.5 mm and about 5 mm. The first adsorbent material may comprise CaX zeolite and the second adsorbent material may comprise 13X zeolite.

The mixture may further comprise water and an additional adsorbent zone may be provided prior to the first adsorbent zone, and this additional adsorbent zone preferably contains adsorbent material which selectively adsorbs water from the gas mixture prior to the first adsorbent zone.

The gas mixture typically is provided at a temperature between about 0° C. and about 50° C. The method may further comprise terminating steps (b) and (c) and regenerating the first and second adsorbent materials by passing therethrough a regeneration gas at a temperature between about 80° C. and 400° C.

The invention includes a system for removing a first and a second minor component from a gas mixture comprising the first and second minor components and one or more major components, which system comprises:

By (a) an adsorber vessel having a first adsorbent zone containing a first adsorbent material and a second adsorbent zone containing a second adsorbent material, wherein the selectivity of the first adsorbent material for the first minor component relative to the second minor component is greater than the selectivity of the second adsorbent material for the first minor component relative to the second minor component, and wherein the average particle diameter of the first adsorbent material and the average particle diameter of the second adsorbent material are substantially the same;

(b) an inlet for passing the gas mixture into the adsorber vessel such that the gas mixture passes through the first adsorbent zone and subsequently through the second adsorbent zone; and (c) an outlet for withdrawing from the adsorber vessel a purified gas containing the one or more major components and depleted in the first and second minor components.

The first minor component may be nitrous oxide and the second minor component may be carbon dioxide. The one or more major components may comprise oxygen and nitrogen. The gas mixture may comprise air.

The average particle diameter of the first adsorbent material preferably is between about 85% and about 115% of the average particle diameter of the second adsorbent material. The average particle diameter of the first adsorbent material may be between about 0.5 mm and about 5 mm. The first adsorbent material may comprise CaX zeolite and the second adsorbent material may comprise 13X zeolite.

The gas mixture may further comprise water and an additional adsorbent zone may be provided prior to the first adsorbent zone, wherein the additional adsorbent zone preferably contains adsorbent material which selectively adsorbs water from the gas mixture prior to the first adsorbent zone.

BRIEF DESCRIPTION OF THE DRAWING

The single FIGURE is a schematic flowsheet for an exemplary embodiment of the present invention.

DETAILED DESCRIPTION OF THE INVENTION

The present invention in its broadest embodiment relates to a method for removing a first and a second minor component from a gas mixture comprising the first and second minor components and one or more major components, which method utilizes one or more adsorber vessels, each having a first adsorbent zone containing a first adsorbent material and a second adsorbent zone containing a second adsorbent material. The selectivity of the first adsorbent material for the first minor component relative to the second minor component preferably is greater than the selectivity of the second adsorbent material for the first minor component relative to the second minor component.

The average particle diameter of the first adsorbent material and the average particle diameter of the second adsorbent material preferably are substantially the same. The gas mixture comprising the first and second minor components and the one or more major components is passed through the first adsorbent zone and subsequently through the second adsorbent zone, wherein the minor components are selectively adsorbed. A purified gas containing the one or more major components and depleted in the first and second minor components is withdrawn from the second adsorbent zone. The invention can be applied to a wide variety of gaseous mixtures containing minor components which are undesirable impurities to be removed from the major components in the feed gas.

A minor component is defined as a component which may be present in a gas mixture at a concentration up to about 1 vol %, and typically this concentration is expressed as parts per million by volume (ppmv). Minor components may be present at even lower concentrations and may be reported in the range of parts per billion (ppbv). A major component is defined as a component present at higher concentrations, typically many orders of magnitude higher, than the concentrations of the minor components.

The invention may be illustrated by the removal of impurities from air feed to a cryogenic air separation process. In this example, referring to the FIGURE, air to be purified is supplied to a main air compressor system 10 at an inlet 12 and is compressed by a multi-stage compressor with inter- and after-cooling by heat exchange with water (not shown). Optionally, the compressed air feed is sub-cooled in cooler 8. The cooled compressed air is supplied to inlet manifold 14 containing inlet control valves 16 and 18 which are connected to via manifold 14 to a pair of adsorbent vessels 20 and 22. Inlet manifold 14 is bridged downstream of the control valves 16 and 18 by a venting manifold 24 containing venting valves 26 and 28 which serve to close and open connections between the upstream end of respective adsorbent vessels 20 and 22 and vent 30 via silencer 32.

The air feed contains undesirable impurities including water, carbon dioxide, light hydrocarbons such as methane, ethane, ethylene, and acetylene, and nitrous oxide. These components must be removed to eliminate pressure drop and plugging problems due to frozen deposits of water and carbon dioxide and also to eliminate the possibility of disastrous energy releases resulting from chemical reactions of hydrocarbons and oxygen. Each of the two adsorbent vessels 20 and 22 typically contains at least two types of adsorbents: a pretreatment adsorbent for removing water and at least two adsorbent materials for removing carbon dioxide, nitrous oxide, and hydrocarbons. The adsorbent vessels 20 and 22 each contain at least lower adsorbent zones or layers 34 and 34', middle adsorbent zones or layers 35 and 35', and upper adsorbent zones or layers 36 and 36', respectively.

Adsorbent layers 34 and 34' each contain a pretreatment adsorbent (for example, silica gel, activated alumina, or 13X zeolite) to adsorb primarily water. Adsorbent layers 35 and 35' each contain a first adsorbent material (for example, a CaX zeolite) which adsorbs carbon dioxide and nitrous oxide. Other adsorbents which may be used in layers 35 and 35' include calcium mordenite, BaX zeolite, CaLSX zeolite, and binderless CaLSX zeolite. Adsorbent layers 36 and 36' each contain a second adsorbent material (for example, a 13X zeolite) which also adsorbs carbon dioxide and nitrous oxide. The pretreatment adsorbent which adsorbs primarily water also may adsorb some carbon dioxide; the first and/or second adsorbent materials preferably also adsorb the hydrocarbons described above.

The depth of layers 34 and 34' may be in the range of 0.5 to 10 ft, the depth of layers 35 and 35' may be in the range of 0.5 to 10 ft, and the depth of layers 36 and 36' may be in the range of 0.5 to 10 ft. Preferably the ratio of the depth of layers 35 and 35' to the depth of layers 36 and 36' is between about 1:10 and about 10:1

The first adsorbent material preferably has a selectivity for nitrous oxide relative to carbon dioxide which is greater than the selectivity of the second adsorbent for nitrous oxide relative to carbon dioxide. Selectivity is defined here as the ratio of the Henry's law constant for one adsorbed component on the adsorbent material to the Henry's law constant for the other adsorbed component on the same adsorbent material at the same conditions. The Henry's law constant is defined as the initial slope of the isotherm which describes the amount of the component adsorbed as a function of gas pressure, preferably at a reference temperature of 30° C. For example, the selectivity of nitrous oxide to carbon dioxide on CaX zeolite is the ratio of the Henry's law constant for nitrous oxide adsorbed on CaX to the Henry's law constant for carbon dioxide adsorbed on CaX at the same temperature.

The particles of the adsorbent materials described herein can be in the shape of beads, extrudates, or can be irregular shapes which result from crushing and sieving. The average particle size of an adsorbent material in the form of beads or irregular shapes is defined as the weighted mean of the particle size distribution as determined by standard methods known in the art. One method is fractionating the adsorbent particles through a series of standard sieve screens as described in the *Chemical Engineers' Handbook*, Fifth Edition, by R. H. Perry and C. H. Chilton, Section 21, Screening. The average particle diameter of extrudates can be calculated by methods given in the *Chemical Engineers' Handbook*, Fifth Edition, by R. H. Perry and C. H. Chilton, Section 5, Beds of Solids.

The average particle size of the first adsorbent material preferably is substantially the same as the average particle size of the second adsorbent material. Because it may be difficult or impractical in large-scale operations to obtain two different adsorbent materials with exactly the same average particle diameter, it is preferable that the average particle diameters of the two adsorbents be as close as possible within reasonable economic considerations. For the purposes of the present disclosure, the term "substantially the same" means qualitatively that the average particle diameters of the two adsorbents are as close as possible within reasonable economic considerations. The phrase "the average particle diameter of the first adsorbent material and the average particle diameter of the second adsorbent material are substantially the same" as used herein means quantitatively that the average particle diameter of the first adsorbent material is between about 85% and about 115% of the average particle diameter of the second adsorbent material. Typically, the average particle diameter of the first adsorbent material is between about 0.5 mm and about 5 mm.

The pretreatment adsorbent and the first and second adsorbents may be arranged in layers as shown in the Figure for axial adsorbent beds. Alternatively, the pretreatment adsorbent and two adsorbent materials may be layered radially in a radial adsorption bed. It should be understood that vessels 20 and 22 each can be separated into smaller vessels arranged in series if desired and that references to "layers" above include arrangements in which the separate adsorbents are placed in separate vessels arranged in series.

The apparatus in the Figure has an outlet 38 connected to the downstream ends of adsorbent vessels 20 and 22 by outlet manifold 40 containing outlet control valves 42 and 44. Outlet 38 provides feed gas to cryogenic air separation unit 45. Outlet manifold 40 is bridged by regenerating gas manifold 46 containing regenerating gas control valves 48 and 50. Upstream from the regenerating gas manifold 46, a line 52 containing a control valve 54 also bridges across the outlet manifold 40.

A regeneration gas is provided via line 56 and control valve 58 to heater 62, and hot gas is provided to regenerating gas manifold 46. The operation of the valves may be controlled by suitable programmable timing and valve opening means as known in the art (not shown).

In operation air is compressed in main compressor system 10 and is fed to inlet manifold 14 and passes through one of the two adsorbent vessels 20 and 22. Starting from a position in which air is passing through open valve 16 to adsorbent vessel 20, and through open valve 42 to the outlet line 38 to air separation unit 45, valve 18 in the inlet manifold will just have been closed to terminate the flow of feed air to vessel 22. Valve 44 also will just have closed. At this stage valves 46, 50, 54, 26 and 28 are all closed. Bed 20 thus is operating in the purification mode while bed 22 is operating in the regeneration mode.

To commence depressurization of bed 22, valve 28 is opened and once the pressure in the vessel 22 has fallen to a desired level, valve 28 is kept open while valve 50 is opened to begin flow of regeneration gas. The regeneration gas typically will be a flow of dry, carbon dioxide-free nitrogen obtained from air separation unit 45, possibly containing small amounts of argon, oxygen and other gases. Valve 58 is opened so that the regeneration gas is heated, for example to a temperature of about 200° C., before passing into vessel 22. The exit purge gas flows from the vessel, through manifold 24, silencer 32, and the vent outlet 30 from which it is discharged to the atmosphere.

At the end of the predetermined regeneration period, valve 58 may be closed to end the flow of regenerating gas and valve 54 may be opened to displace nitrogen from the adsorbent and, after the closing of valve 28, to depressurize vessel 22 with purified air. Thereafter, valve 54 may be closed and valves 18 and 44 may be opened to put vessel 22 back on line. Vessel 20 may then be regenerated in a similar manner and the whole sequence continued in repeating cycles with vessels 20 and 22 proceeding in alternating modes through the steps of air purification, depressurization, regeneration, and repressurization.

It will be appreciated that although the invention has been illustrated above with reference to an example for the purification of air feed to a cryogenic air separation plant, many variations and modifications of the invention are possible for use in this and other embodiments for different types of gas mixtures.

EXAMPLE 1

Laboratory tests were carried out using an 8 inch diameter adsorber vessel which was filled to a depth of 3 ft with CaX zeolite with an average particle diameter of 2.8 mm. The adsorbent initially was regenerated in flowing nitrogen at 200° C. Air containing 385 ppmv carbon dioxide and 315 ppbv nitrous oxide was introduced into the adsorber in an upflow mode at 41 Ibmoles/(hr·ft$^2$), a temperature of 21° C., and a pressure of 5.7 bara. The outlet concentration of carbon dioxide was measured as a function of time, in particular the time between observed outlet concentrations of 1 ppmv and 385 ppmv (the inlet concentration). The outlet concentration of nitrous oxide also was measured. The length of unused bed (LUB) for carbon dioxide was determined from these measurements by known methods such as those described in Principles of Adsorption and Adsorption Processes by D. Ruthven, John Wiley and Sons (1984). The length of unused bed is defined as half the length of the mass transfer zone earlier defined.

The same experiment was repeated using 13X zeolite with a bed depth of 5 ft and an average particle diameter of 2.8 mm. The same measurements were made and the data were analyzed similarly. Table 1 shows the length of unused bed for carbon dioxide determined for each adsorbent and the % nitrous oxide removed. The % nitrous oxide removed is defined as the % of the nitrous oxide in the feed gas which is removed between the start of adsorption with a regenerated bed and the time when the carbon dioxide concentration in the adsorber outlet reached 1 ppmv.

TABLE 1

|  | Conventional Nuclear Fuel Electrorefiner | Nuclear Fuel Electrorefiner of the Present Invention |
|---|---|---|
| amp.hours (Ah) per U dissolved (Ah/kg) | 434.6 | >434.6 |
| ave. dissolution current at fuel dissolution basket (A) | 58.2 | >100 |
| ave. dissolution time (h/kg) | 7.5 | <4.4 |
| dissolution rate (g/h) | 134 | >230 |
| net collection current at cathode (A) | 26.9 | >100 |
| net collection rate at cathode (g/h) | 80 | >300 |

The results show that the 13X zeolite unexpectedly has a shorter length of unused bed and therefore a shorter mass transfer zone than the CaX zeolite, even though CaX has a higher carbon dioxide equilibrium capacity than 13X.

EXAMPLE 2

The adsorbent bed of Example 1 was modified by placing a 12 inch layer of 13X on top of a 3 ft layer of CaX adsorbent. The above experiment was repeated wherein the gas flow was upward, passing through the CaX and 13X adsorbent layers in that order. The data were obtained and analyzed in the same way, and the results are shown in Table 2.

TABLE 2

| Adsorbent | Length of unused bed for carbon dioxide, inches | % nitrous oxide removal |
|---|---|---|
| CaX | 17 | 97 |
| CaX followed by 13X | 13 | 86 |

It is seen that the length of unused bed and thus the length of the mass transfer zone is shorter for the combination of CaX and 13 X adsorbents than for the CaX adsorbent alone. This shortening of the length of unused bed was unexpected since CaX has a higher carbon dioxide equilibrium capacity than 13X.

Thus the use of CaX followed by 13X adsorbent of the same particle size according to the present invention yields a shortened length of unused bed for carbon dioxide and has several advantages over the use of a small particle size adsorbent layer on top of a large particle size adsorbent layer operated in upflow mode as disclosed in the prior art described above. The present invention reduces the total pressure drop through the adsorbent bed, reduces the potential for adsorbent fluidization, and reduces the resulting potential for attrition and particulate carryover.

What is claimed is:

1. A method for removing a first and a second minor component from a gas mixture comprising the first and second minor components and one or more major components, which method comprises the steps of:
    (a) providing a first adsorbent zone containing a first adsorbent material and a second adsorbent zone containing a second adsorbent material, wherein the selectivity of the first adsorbent material for the first minor component relative to the second minor component is greater than the selectivity of the second adsorbent material for the first minor component relative to the second minor component, and wherein the average particle diameter of the first adsorbent material and the average particle diameter of the second adsorbent material are substantially the same;
    (b) passing the gas mixture comprising the first and second minor components and the one or more major components through the first adsorbent zone and subsequently through the second adsorbent zone; and
    (c) withdrawing from the second adsorbent zone a purified gas containing the one or more major components and depleted in the first and second minor components.

2. The method of claim 1 wherein the first minor component is nitrous oxide and the second minor component is carbon dioxide.

3. The method of claim 1 wherein the one or more major components comprise oxygen and nitrogen.

4. The method of claim 3 wherein the gas mixture comprises air.

5. The method of claim 1 wherein the average particle diameter of the first adsorbent material is between about 85% and about 115% of the average particle diameter of the second adsorbent material.

6. The method of claim 5 wherein the average particle diameter of the first adsorbent material is between about 0.5 mm and about 5 mm.

7. The method of claim 1 wherein the first adsorbent material comprises CaX zeolite and the second adsorbent material comprises 13X zeolite.

8. The method of claim 1 wherein the gas mixture further comprises water and an additional adsorbent zone is provided prior to the first adsorbent zone, and wherein the additional adsorbent zone contains adsorbent material which selectively adsorbs water from the gas mixture prior to the first adsorbent zone.

9. The method of claim 1 wherein the gas mixture is provided at a temperature between about 0° C. and about 50° C.

10. The method of claim 9 which further comprises terminating steps (b) and (c) and regenerating the first and second adsorbent materials by passing therethrough a regeneration gas at a temperature between about 80° C. and 400° C.

11. A system for removing a first and a second minor component from a gas mixture comprising the first and second minor components and one or more major components, which system comprises:
    (a), an adsorber vessel having a first adsorbent zone containing a first adsorbent material and a second adsorbent zone containing a second adsorbent material, wherein the selectivity of the first adsorbent material for the first minor component relative to the second minor component is greater than the selectivity of the second adsorbent material for the first minor component relative to the second minor component, and wherein the average particle diameter of the first adsorbent material and the average particle diameter of the second adsorbent material are substantially the same;
    (b) an inlet for passing the gas mixture into the adsorber vessel such that the gas mixture passes through the first adsorbent zone and subsequently through the second adsorbent zone; and
    (c) an outlet for withdrawing from the adsorber vessel a purified gas containing the one or more major components and depleted in the first and second minor components.

12. The system of claim 11 wherein the first minor component is nitrous oxide and the second minor component is carbon dioxide.

13. The system of claim 11 wherein the one or more major components comprise oxygen and nitrogen.

14. The system of claim 13 wherein the as mixture comprises air.

15. The system of claim 11 wherein the average particle diameter of the first adsorbent material is between about 85% and about 115% of the average particle diameter of the second adsorbent material.

16. The system of claim 15 wherein the average particle diameter of the first adsorbent material is between about 0.5 mm and about 5 mm.

17. The system of claim 11 wherein the first adsorbent material comprises CaX zeolite and the second adsorbent material comprises 13X zeolite.

18. The system of claim 11 wherein the gas mixture further comprises water and an additional adsorbent zone is provided prior to the first adsorbent zone, and wherein the additional adsorbent zone contains adsorbent material which selectively adsorbs water from the gas mixture prior to the first adsorbent zone.

* * * * *